United States Patent
Curtis

(10) Patent No.: US 7,945,116 B2
(45) Date of Patent: May 17, 2011

(54) COMPUTER-ASSISTED IMAGE CROPPING FOR BOOK SCANS

(75) Inventor: Donald B. Curtis, Highland, UT (US)

(73) Assignee: Ancestry.com Operations Inc., Provo, UT (US)

( * ) Notice: Subject to any disclaimer, the term of this patent is extended or adjusted under 35 U.S.C. 154(b) by 937 days.

(21) Appl. No.: 11/841,268

(22) Filed: Aug. 20, 2007

(65) Prior Publication Data

US 2009/0052792 A1    Feb. 26, 2009

(51) Int. Cl.
*G06K 9/20* (2006.01)
*G06K 9/00* (2006.01)
*G06K 9/34* (2006.01)
*G03B 27/32* (2006.01)
*G09G 5/00* (2006.01)

(52) U.S. Cl. ........ 382/282; 382/135; 382/175; 382/180; 382/283; 355/25; 345/620

(58) Field of Classification Search ........... 382/282; 355/25

See application file for complete search history.

(56) References Cited

U.S. PATENT DOCUMENTS

| 5,057,869 A | 10/1991 | Graves et al. |
| 7,133,638 B2 * | 11/2006 | Kelly et al. ............ 399/376 |
| 7,454,697 B2 * | 11/2008 | Kremer et al. ............ 715/251 |
| 2005/0100319 A1 | 5/2005 | Saed |

* cited by examiner

*Primary Examiner* — Brian Q Le
*Assistant Examiner* — Jose M Torres
(74) *Attorney, Agent, or Firm* — Kilpatrick Townsend & Stockton, LLP

(57) ABSTRACT

Methods and systems for cropping images of book pages are disclosed according to one embodiment of the invention. A method may include identifying reference images and receiving cropping rectangles for the reference images. These cropping rectangles associated with reference images may then be used to generate cropping rectangles for images of book pages between the reference images. The cropping rectangles may be generated based on a linear interpolation of the cropping rectangles associated with the reference images and the number of pages between images. The method may also display one or more images of book pages with the associated one or more cropping rectangles superimposed thereon. A user may then have the opportunity to make adjustments to the position and/or size of the cropping rectangles.

20 Claims, 8 Drawing Sheets

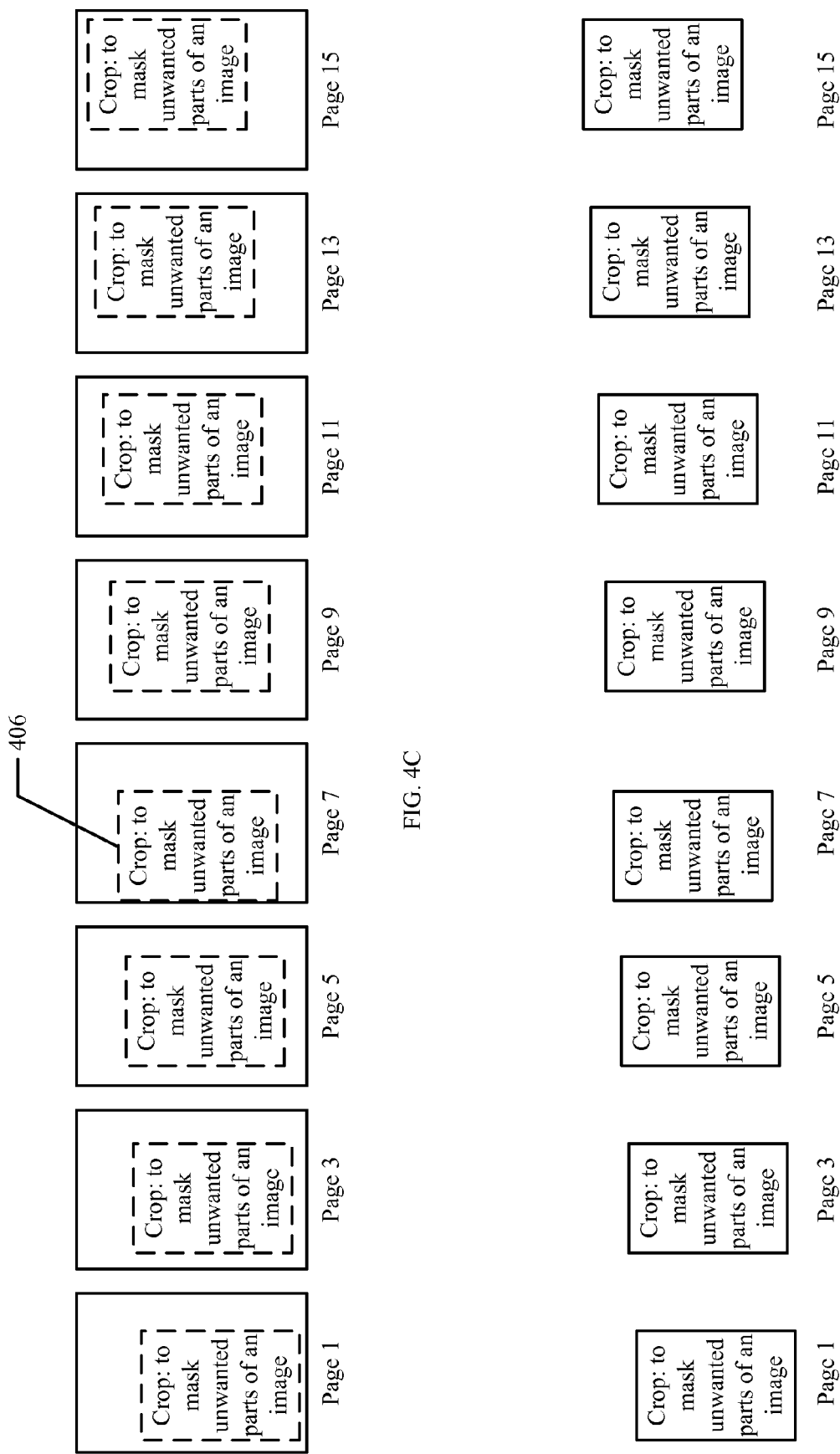

| Crop: to mask unwanted parts of an image | Crop: to mask unwanted parts of an image | Crop: to mask unwanted parts of an image | Crop: to mask unwanted parts of an image | Crop: to mask unwanted parts of an image | Crop: to mask unwanted parts of an image | Crop: to mask unwanted parts of an image | Crop: to mask unwanted parts of an image |
|---|---|---|---|---|---|---|---|
| Page 1 | Page 3 | Page 5 | Page 7 | Page 9 | Page 11 | Page 13 | Page 15 |

FIG. 4E

COMPUTER-ASSISTED IMAGE CROPPING FOR BOOK SCANS

BACKGROUND OF THE INVENTION

This disclosure relates in general to image cropping and, but not by way of limitation, to image cropping of book scans amongst other things.

Book scanners enable rapid scanning of books without damaging the book's binding. Some book scanners, such as those produced by Kirtas, use jets of air and a mechanical suction device to automatically turn the pages of the book, timed in synchronization with two cameras that photograph both open pages of the book. As the pages are turned, the book's position is adjusted to compensate for the amount of binding on one side or the other of the open pages. The compensation is intended to be linear and largely automatic, but in practice, manual adjustments are sometimes required to keep the book positioned optimally. To avoid missing any content, the cameras are positioned and focused so that they image the appropriate page and part of the other open page and some surrounding machinery.

In some book scanning applications the images may need cropping prior to being presented to an OCR (Optical Character Recognition) engine or a customer. The cropping keeps the OCR engine from recognizing content on the wrong page and keeps the image size smaller for faster downloads and for more aesthetically pleasing images for the customer.

A cropping rectangle could be specified manually for each image, but doing so adds a tremendous cost. There are some automated cropping tools that have been used, but such tools tend to crop too much or too little from the images.

Accordingly, there is a need in the art to provide a cropping tool that quickly and properly crops unwanted portions of a scanned image.

BRIEF SUMMARY OF THE INVENTION

In one embodiment, the present disclosure provides a method for cropping a plurality of related images, for example, images of book pages from a book scanner. The method may include identifying reference images that are separated by an interval of images and receiving cropping rectangles for these reference images from a user. The method may then generate cropping rectangles for each image that is not a reference image, for example, based on a linear interpolation of the size and/or position of the cropping rectangles associated with the reference images and based on the number of images between the reference images. The one or more images with the associated cropping rectangle superimposed thereon may be displayed to a user, for example, so that the user can verify that the interpolated cropping rectangles are satisfactory. These images may be cropped using the cropping rectangles associated with each image. In some instances, for example, when an image is not in between two reference images, the cropping rectangle of the nearest reference image may be used as the cropping rectangle for that image. Other embodiments of the invention use shapes other than rectangles for cropping. For example, these other shapes may include a rhombus, parallelogram, triangle, square, polygon, oval, circle, pentagon, etc.

In some embodiments of the invention, right and left book pages may be considered separately from each other. Various page intervals may be used, for example, random intervals, fixed intervals, or intervals determined by the presence of cropping rectangles or cropped images. In another embodiment of the invention, the page intervals may be based on sections or chapters of the book being scanned. In yet another embodiment of the invention the intervals may depend on pages where the book or scanner was manually and/or automatically adjusted during scanner. In such a case, the pages where the book or scanner was manually and/or automatically adjusted may be digitally saved in a file.

Another method for cropping images of book pages is disclosed according to another embodiment of the invention. The method may include receiving a page interval from a user and identifying reference images of book pages that are multiples of the page interval. Cropping rectangles may then be received from the user for the reference rectangles. The cropping rectangles associated with the reference images may be used to interpolate the cropping rectangles for the rest of the images. For example, a linear interpolation based on the size, dimension and the number of intermediate pages may be used to generate cropping rectangles. These cropping rectangles may then be displayed superimposed on the associated image. The images may then be cropped according to the cropping rectangles.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIGS. 4A-4E show exemplary images of book pages being cropped according to one embodiment of the invention.

Figure 1A:
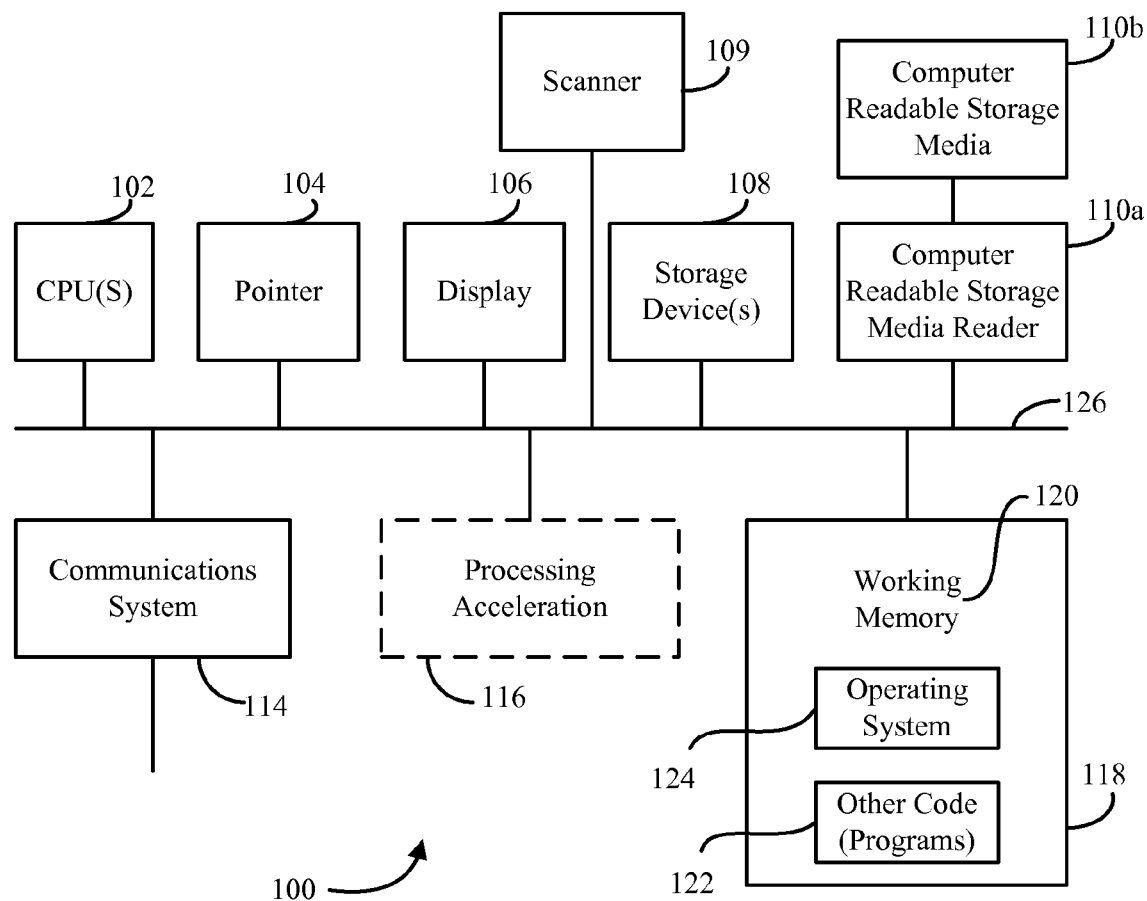
FIG. 1A shows a schematic illustration of a physical structure of a computer system that may be used to implement embodiments of the invention.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is to be understood that various changes may be made in the function and arrangement of elements without departing from the spirit and scope as set forth in the appended claims.

In one embodiment, the present disclosure provides for methods and systems for cropping images of book pages. Some scanners opt to over scan a page in order to capture the entire page area, requiring subsequent processing to crop the unnecessary portions of the image. The images of book pages may be cropped by first identifying reference images. These reference images may be separated by an interval of images. Cropping rectangles may be created for these reference images. The intervals may be random, fixed, based on properties of the book and/or based on properties from the scan. For example, a user may want cropping rectangles on every 20th page. Accordingly, the user may then specify cropping rectangles for pages 1, 21, 41, 61, etc. In some embodiments, the cropping for odd and even pages may be specified separately, therefore, odd and even pages may utilize separate reference images. For example, using an interval of 20 pages, a user may specify reference cropping rectangles on pages 1, 41, 81, 121, etc. for the odd pages and 2, 42, 82, 122, etc. for the even pages. The page numbers being counted from the first scanned page on up to the last scanned page.

In another embodiment, the cropping rectangles on reference images may be confirmed rather than explicitly specified. For instance, some reference images of book pages may be properly cropped by an interpolated cropping rectangle. Rather than manually specifying cropping rectangles on such pages or even at every interval, a user may simply confirm that the currently defined cropping rectangle is appropriate or sufficient. On some pages the user may explicitly specify a cropping rectangle and on other pages the user may confirm previously defined or interpolated cropping. Also, automatic confirmation of previously placed cropping rectangles may occur. Moreover, the cropping interval may be random, fixed, based on properties of the book and/or based on properties from the scan. The interval may also be based on the variability of the cropping in a particular section of a book. In some sections more user-specified cropping may be required and a smaller interval may be used whereas other sections may allow for larger intervals.

According to one embodiment of the invention, once the cropping rectangles on reference images have been specified or confirmed by the user, cropping rectangles on images of book pages between reference images may generated. The size and position of these cropping rectangles may be determined by using a linear interpolation of the size and position of the cropping rectangles associated with the reference images.

For example, on page 2 a cropping rectangle of 200 horizontal pixels by 300 vertical pixels and with a lower left position at 10 pixels along the horizontal and 20 pixels along the vertical. On page 42 a cropping rectangle of 240 horizontal pixels and 400 vertical pixels position at 30 pixels along the horizontal and 0 pixels along the vertical. Using a linear interpolation from the two cropping rectangles associated with reference images on pages 2 and 42 the even pages may have the dimension and position as shown in table 1.

TABLE 1

Linear Interpolation Of Cropping Rectangle Dimensions And Positions Between Reference Images

| Page | Horizontal Dimension | Vertical Dimension | Horizontal Position | Vertical Position |
|---|---|---|---|---|
| 2 | 200 | 300 | 10 | 20 |
| 4 | 202 | 305 | 11 | 19 |
| 6 | 204 | 310 | 12 | 18 |
| 8 | 206 | 315 | 13 | 17 |
| 10 | 208 | 320 | 14 | 16 |
| 12 | 210 | 325 | 15 | 15 |
| 14 | 212 | 330 | 16 | 14 |
| 16 | 214 | 335 | 17 | 13 |
| 18 | 216 | 340 | 18 | 12 |
| 20 | 218 | 345 | 19 | 11 |
| 22 | 220 | 350 | 20 | 10 |
| 24 | 222 | 355 | 21 | 9 |
| 26 | 224 | 360 | 22 | 8 |
| 28 | 226 | 365 | 23 | 7 |
| 30 | 228 | 370 | 24 | 6 |
| 32 | 230 | 375 | 25 | 5 |
| 34 | 232 | 380 | 26 | 4 |
| 36 | 234 | 385 | 27 | 3 |
| 38 | 236 | 390 | 28 | 2 |
| 40 | 238 | 395 | 29 | 1 |
| 42 | 240 | 400 | 30 | 0 |

Other interpolations may be used to determine the dimension and position of cropping rectangles on images of book pages. Once the dimension and position of the cropping rectangles have been generated the cropping rectangles may be displayed overlaying the image of the book. In various embodiments of the invention, cropping rectangles may dynamically adjust to changes to cropping rectangles on reference images. For example, a user may then visually adjust the position and or dimension of each of the cropping rectangles. As a cropping rectangle associated with a reference image is adjusted, the position and dimension of related cropping rectangles may dynamically adjust according to changes in the cropping rectangle associated with a reference image. As another example, if a user adjusts a cropping rectangle on a non-reference image, that image automatically becomes a reference image and those cropping rectangles on images between this image and other reference images may be adjusted based on the position and dimensions of the cropping rectangle of the image.

According to another embodiment of the invention, once the cropping rectangles have been generated and potentially adjusted, the images of the book pages may be cropped according to the cropping rectangles. In another embodiment, the cropping rectangles may be saved in association with specific images and cropped later using a separate cropping routine or function.

FIG. 1A shows a schematic illustration of a physical structure of a computer system 100 that may be used to implement embodiments of the invention. FIG. 1A broadly illustrates how individual system elements may be implemented in a separated or more integrated manner. The host system 100 is shown comprised of hardware elements that are electrically coupled via bus 126, including the host processor 102, an input device 104, an output device 106, a storage device 108, a scanner 109, a computer-readable storage media reader 110*a*, a communications system 114, a processing acceleration unit 116 such as a DSP or special-purpose processor, and a memory 118. The computer-readable storage media reader 110*a* may be further connected to a computer-readable storage medium 110*b*, the combination comprehensively representing remote, local, fixed, and/or removable storage devices plus storage media for temporarily and/or more permanently containing computer-readable information. The communications system 114 may comprise a wired, wireless, modem, and/or other type of interfacing connection and permits data to be exchanged with a communication network such as the Internet or an intranet.

The host system 100 also comprises software elements, shown as being currently located within working memory 120, including an operating system 124 and other code 122, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 1B:
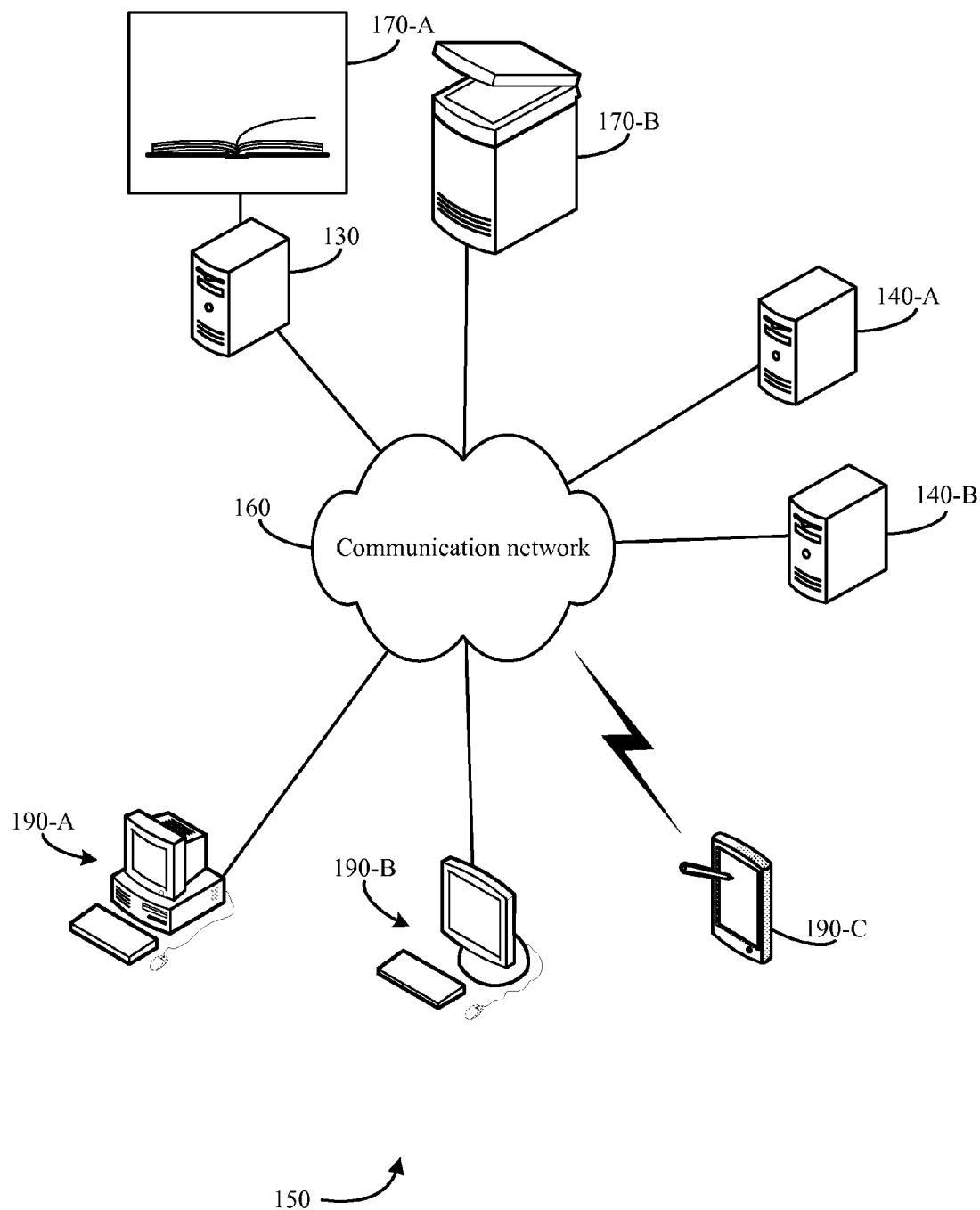
FIG. 1B shows a schematic illustration of a computer network that may be used to implement embodiments of the invention.

FIG. 1B shows a schematic illustration of a computer network 150 that may be used to implement embodiments of the invention. The computer network includes a variety of computer systems 190. Such computer systems 190 may include the architecture shown in FIG. 1A. The computer systems may include user interfaces such as a keyboard, mouse, stylus, touch screen, display, etc. Each of the computer systems 190 may be in communication with a communication network 160 such as, for example, the Internet or an intranet. For example, computer system 190-C is wirelessly connected to the communication network 160. The computer network 150 also includes book scanner 170-A and scanner 170-B. Book scanner 170-A is coupled with a computer system 130. The computer system 130 controls and operates the functionality of the book scanner 170-A as well as stores scanned images and communicates with the communication network 160. Scanner 170-B includes a computer system that is capable of storing images and sending images to other devices on the network. The computer network 150 also includes image storage devices 140. These image storage devices can be used to store images scanned by the scanners. Operators of the computer systems 190 may access the images storage in the image storage devices 140 through the network 160. Other embodiments may include other network storage devices or may store images at the computer systems or other locations.

Figure 1C:
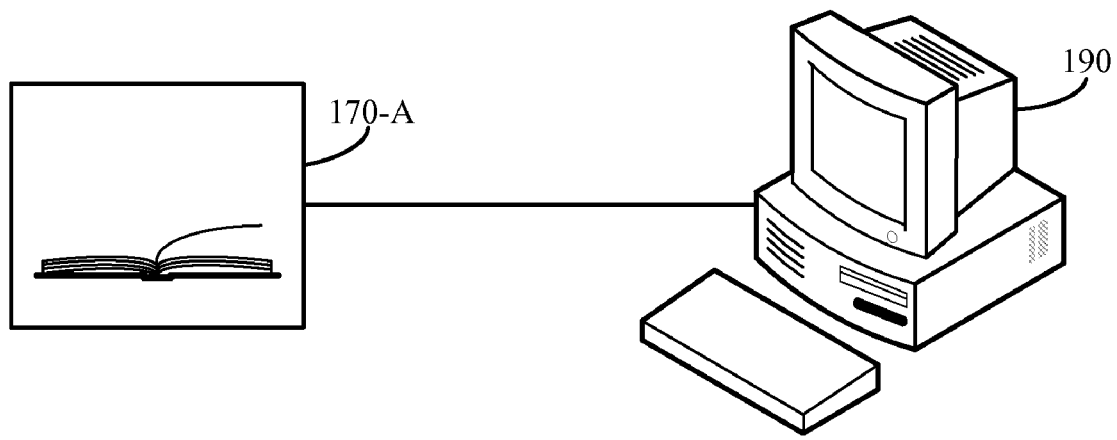
FIG. 1C shows another schematic illustration of another computer system that may be used for embodiments of the invention.

FIG. 1C shows another schematic illustration of another computer system that may be used for embodiments of the invention. The computer system includes a computer 190 with a display and input devices. The computer 190 is coupled with a book scanner 170-A. The computer 190 may control the operation of the scanner. A user may scan images with the book-scanner 170-A that may be saved on the computer 190. The images may then be displayed on the computer display. The user may then employ embodiments of the invention to define cropping rectangles.

Figure 2:
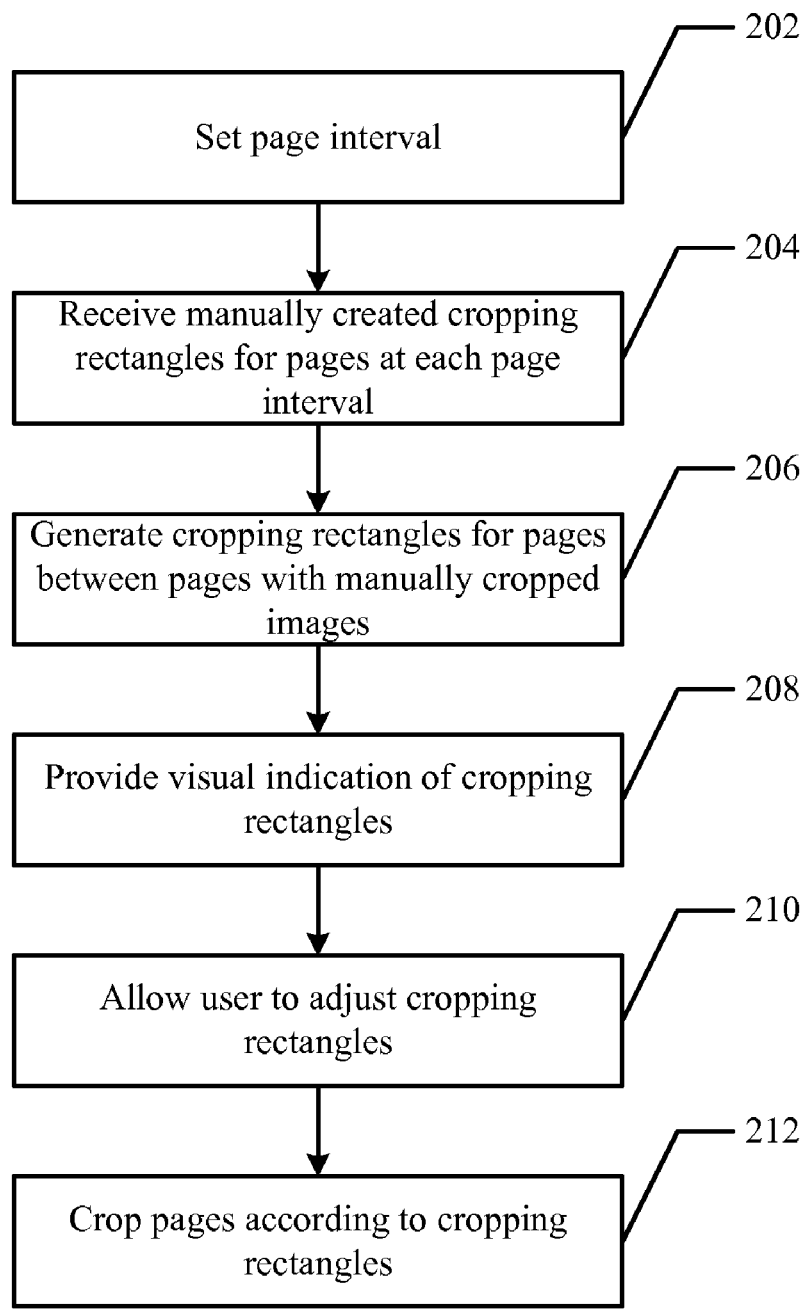
FIG. 2 is a flowchart of a method for cropping images of scanned book pages according to one embodiment of the invention.

Referring now to FIG. 2, a flowchart of a method for cropping images of scanned book pages is shown according to one embodiment of the invention. At block 202, the page interval is set. The page interval may be set by the user each time the user crops images of book pages. The page interval may also be set globally and used for every set of book images. Moreover, in another embodiment, the intervals may be random, fixed, based on properties of the book and/or based on properties from the scan. In yet another embodiment, the intervals may be defined by images with preexisting cropping rectangles that already exist from user input or from previously created cropping rectangles. A fixed interval may be set, for example, at 10, 20, 40 or 50 pages.

If cropping rectangles do not exist on images or if they only exist on some of the images, the user may create and present reference images on pages at multiples of the intervals at block 204. For example, if the interval is set at 20, the user may create cropping rectangles every 20 pages. That is, for example, on pages 1, 21, 41, 61, 81, etc. If even and odd pages are considered separately, then the even pages may be, for example, pages 2, 22, 42, 62, 82, etc. The dimension and location of each cropping rectangle is noted. The cropping rectangles may be received through a user interface of a computer device, for example, through a keyboard, mouse, stylus, pointing device, touch screen, etc.

Once cropping rectangles for reference images are entered at the defined intervals, cropping rectangles may be generated for each of the intervening images of book pages at block 206. The cropping rectangles may be generated based on the cropping rectangles associated with reference images using a linear interpolation. Other functions or interpolations may also be used. Table 1 shows an exemplary listing of linear interpolations of the dimension and position of cropping rectangles based on cropping rectangles associated with reference images. In some embodiments, where only a single reference image is adjacent to an image of interest, the size and position of the cropping rectangle associated with the reference image is used for that image of a book page.

A linear interpolation from characteristics of cropping rectangles of reference images may be determined from the following equation:

$$x_i = \frac{x_{ref1} - x_{ref2}}{p_{ref1} - p_{ref2}} \cdot (p_i - p_{ref1}) + x_{ref1}. \qquad \text{eq. 1}$$

where $x_i$ is the dimension of the $i^{th}$ image of interest. The dimension may be the horizontal position, the vertical position, the width or the height of a cropping rectangle. $x_{ref1}$ is the dimension of a cropping rectangle associate with a first reference image and $x_{ref2}$ is the dimension of a cropping rectangle associate with a second reference image. $p_i$ is the page number of the image of interest, $p_{ref1}$ is the page number of the first reference image, $p_{ref2}$ is the page number of the second reference image.

At block 208 a visual indication of the cropping rectangles is provided. For example, the cropping rectangles may be displayed and superimposed on each image of a book page. Each of these images may be displayed separately. A user may then quickly scroll through each of the images and determine the quality of the cropping rectangles relative to each image. In another embodiment, a plurality of images may be displayed on a single screen, for example, as thumbnail images. The associated cropping rectangles may then be superimposed on each of the plurality of thumbnail images. Various other ways of displaying images of book pages with cropping rectangles superimposed thereon may also be employed.

A user may then be able to adjust each of the reference and/or generated cropping rectangles at block 210. For instance, the user may scroll through each of the images of book pages and consider whether the cropping rectangle is properly positioned and sized. If a cropping rectangle is not properly positioned and/or sized, the user may adjust the size and/or position of the cropping rectangle. In some embodiments, adjusting the size and/or position of one cropping rectangle effectively makes it a reference rectangle, and other cropping rectangles on adjacent pages may be adjusted according to the linear interpolation. In other embodiments, adjustments to cropping rectangles may affect only the adjusted rectangles themselves.

Each image of book pages may then be cropped using the cropping rectangles at block 212. This cropping may, for example, occur after confirmation that the cropping rectangles have been approved by the user. In another embodiment, the cropping may occur at a later point. In such an embodiment, the cropping rectangles may be saved in association with each of the images of book pages. In other embodiments, the cropping rectangles are saved separately from the images of book pages with a reference showing an association between cropping rectangles and images of book pages.

Figure 3:
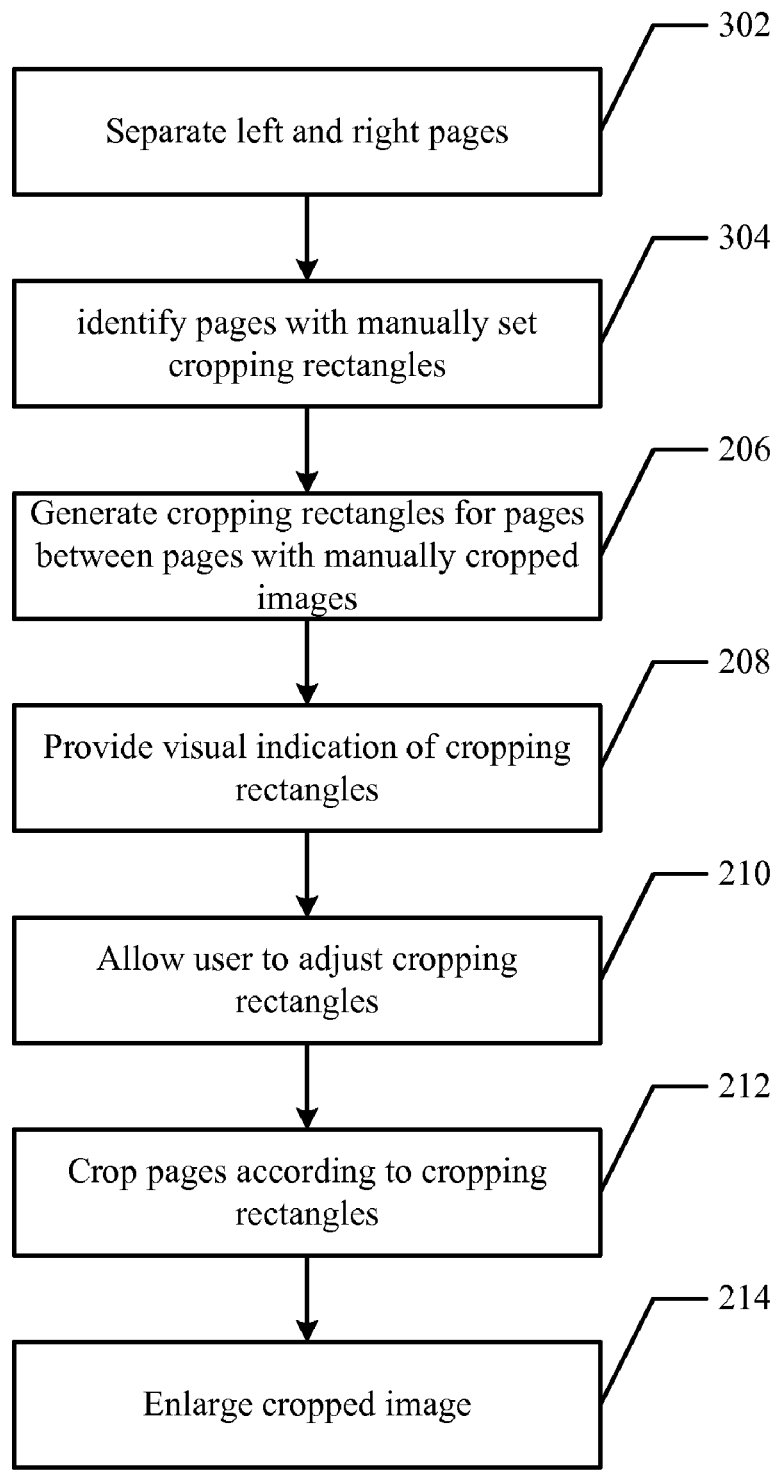
FIG. 3 is another flowchart of a method for cropping images of scanned book pages according to one embodiment of the invention.

FIG. 3 shows a flowchart of a method for cropping images of scanned book pages according to another embodiment of the invention. In this embodiment, left and right pages (odd and even pages) may be considered separately at block 302. Often book scanners use two cameras to scan images of the book pages. One camera may be used to image left pages and another to image right pages. Accordingly, left pages may need to be cropped differently than right pages. For example, the left camera may overshoot the left page by including portions of the right page on the right side of the image. Accordingly, this portion of the right image may need to be cropped out of the image. A right page may also be imaged with a portion of the left page on the left of the image that may need to be cropped out. Thus, in some embodiments, right and left pages may need to be uniquely and independently cropped.

Some pages may have been previously manually cropped and/or cropped using an automated cropping function. Also, rather than cropping, such images may have a cropping rectangle associated therewith. Moreover, cropping rectangles may also be entered by a person on various images of book pages at this point. Such images with cropping rectangles, whether manually or automatically created and whether cropped or not, may be identified and/or flagged at block 304 as reference images.

Blocks 206, 208, 210, and 212 of the flowchart shown in FIG. 3 are similar to the blocks of the same reference designator shown in FIG. 2.

While two separate flow charts are shown with various different and similar steps in FIGS. 2 and 3, these steps may occur in any order. Moreover, steps shown in FIG. 3 may be used in FIG. 2 and vice versa. Those skilled in the art will recognize the utility of each of the steps singularly and in various combinations and/or permutations.

Figure 4A:
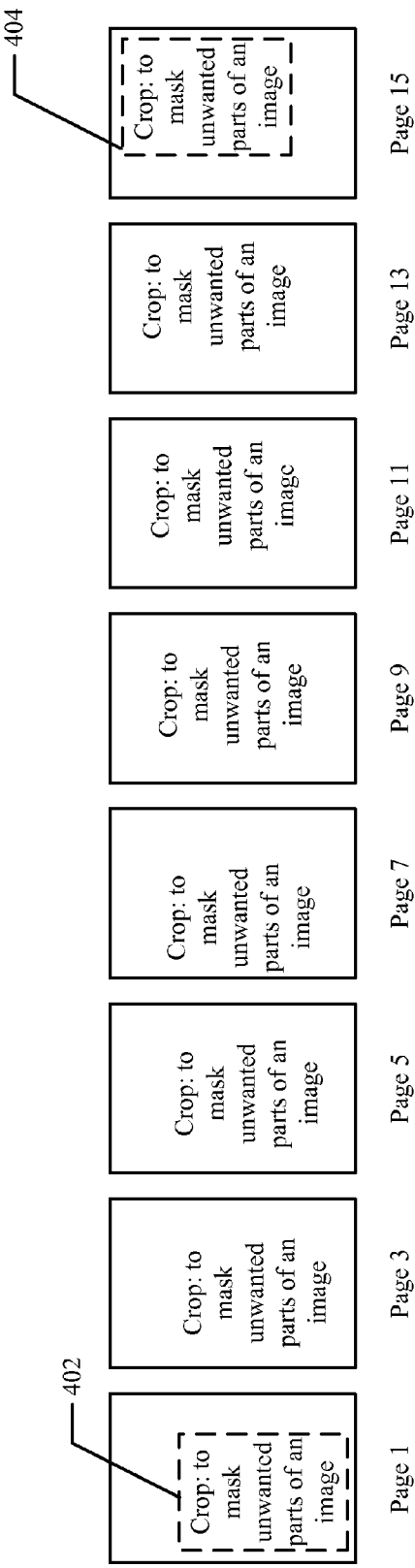

FIGS. 4A-4E show exemplary images of book pages in the process of being cropped according to one embodiment of the invention. FIG. 4A, shows 8 exemplary images of scanned book pages. These images are labeled Page 1, Page 3, Page 5, Page 7, Page 9, Page 11, Page 13 and Page 15. Page 1 and Page 15 are identified as reference images. A cropping rectangle 402 is shown on Page 1 and a cropping rectangle 404 is shown on Page 15. The cropping rectangles may have been specified on Page 1 and Page 15 because of a fixed interval, for example, a fixed interval of 14, and/or from previously and/or manually created cropping rectangles.

Figure 4B:
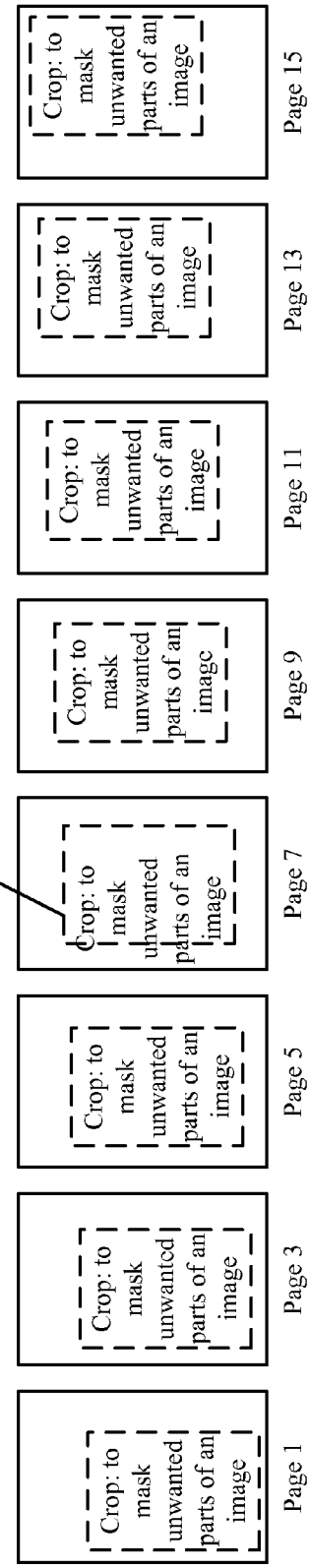

FIG. 4B shows generated cropping rectangles on Page 3, Page 5, Page 7, Page 9, Page 11, and Page 13. These cropping rectangles were generated using a linear interpolation of the position and/or the size of the reference cropping rectangles 402, 404. In some embodiments that size of the reference rectangles are not adjusted through cropping. As can be seen in the figure, these generated cropping rectangles follow a linear progression from a lower left position on the image of Page 1 to an upper right position on the image of Page 15. Often images of book scans can drift over time as the book is scanned and the position of the pages changes based on the thickness, size, and/or stiffness of the binding of the book being scanned.

As seen in FIG. 4B, the generated cropping rectangle 406 of Page 7 is not aligned with the portion of the image of interest. Accordingly, the user may be provided with the opportunity to adjust the generated cropping rectangle. For example, an image of the book page may be shown to the user as a thumbnail, in a group and/or as a large image, and the user may move a cropping rectangle as needed. As shown in FIG. 4C, the generated cropping rectangle 406 has been moved to more properly frame the image of interest. Moving a cropping rectangle may mean that it becomes a reference rectangle, or in other embodiments, moving a generated cropping rectangle to a new position may not affect other cropping rectangles at all.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. FIG. 4D shows the images of the book pages after cropping. FIG. 4E shows the images enlarged and aligned.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for cropping a plurality of related images, the method comprising:
   providing a scanned document;
   receiving a page interval identifying a plurality of pages from the scanned document;
   identifying a first reference image on a first page of the page interval;
   identifying a second reference image on a second page of the page interval, wherein the first page and the second page are separated by a plurality of pages having images thereon;
   defining a first cropping area on the first page for the first reference image;
   defining a second cropping area on the second page for the second reference image, wherein the position of the first cropping area with respect to the first page is different than the position of the second cropping area with respect to the second page;
   defining a cropping area on each of the plurality of pages for each of the images thereon, wherein the cropping areas on each of the plurality of pages are defined based on the positions of the first cropping area and the second cropping area;
   providing an interface adapted to allow a user to adjust one or more of the cropping areas;
   displaying on the interface, each of the pages with the associated cropping areas superimposed thereon;
   receiving from the user, an adjustment of at least one of the cropping areas of the plurality of pages; and
   redefining the cropping area of the page associated with the adjusted cropping area.

2. The method according to claim 1, wherein the cropping areas comprise cropping rectangles.

3. The method according to claim 1, wherein the scanned document comprises a set of images of book pages.

4. The method according to claim 3, further comprising separating images of right and left book pages and cropping the right book pages separately from the left book pages.

5. The method according to claim 3, wherein the page interval is based on features of the book.

6. The method according to claim 1, further comprising cropping the images according to the cropping areas.

7. The method according to claim 1, wherein defining a cropping area on each of the plurality of pages comprises generating cropping areas that are a linear interpolation of the position of the first cropping area on the first page and the position of the second cropping area on the second page.

8. The method according to claim 7, wherein the linear interpolation depends on the number of pages between the first page and the second page.

9. The method according to claim 7, wherein the linear interpolation comprises a linear interpolation of the size of the cropping areas associated with the first page and the second page.

10. The method according to claim 1, wherein defining a cropping area on each of the plurality of pages comprises defining a cropping area that is sized substantially similar to the first cropping area.

11. The method according to claim 1, wherein the page interval is provided by a user.

12. The method according to claim 1, wherein the page interval is based on features of the scanned document.

13. The method according to claim 1, wherein the page interval is a fixed interval.

14. The method according to claim 1, wherein the page interval is defined by previously cropped images.

15. A method for cropping images of book pages, the method comprising:
   receiving a page interval from a user;
   identifying a first reference image on a first page of the page interval;
   identifying a second reference image on a second page of the page interval, wherein the first page and the second page are separated by a third page having a third reference image thereon;
   defining a first cropping rectangle on the first page for the first reference image, wherein the first cropping rectangle is located at a first position with respect to the first page;
   defining a second cropping rectangle on the second page for the second reference image, wherein the second cropping rectangle is located at a second position with respect to the second page, and wherein the second position is different than the first position;
   defining a third cropping rectangle on the third page for the third reference image, wherein the third cropping rectangle is located at a third position with respect to the third page, and wherein the third position is based on an interpolation of the first position and the second position;
   displaying each of the first page, the second page, and the third page with the associated cropping rectangle superimposed thereon;
   providing an interface adapted to allow a user to adjust the size or position of one or more of the cropping rectangles;
   receiving an adjustment of third position from the user;
   redefining the third cropping rectangle based on the adjustment; and
   cropping the images of book pages according to the cropping rectangles.

16. The method according to claim 15, wherein the page interval comprises a varying interval.

17. The method according to claim 15, wherein the page interval comprises a fixed interval.

18. The method according to claim 15, wherein the interpolation of the first position and the second position comprises a linear interpolation of the cropping rectangles associated with the first position and the second position.

19. The method according to claim 18, wherein the linear interpolation comprises a linear interpolation of the size of the cropping rectangles associated with the first position and the second position.

20. A method for cropping images of book pages, the method comprising:
- receiving a page interval from a user, wherein the page interval is a set number of pages;
- identifying a first reference image on a first page of the page interval;
- identifying a second reference image on a second page of the page interval, wherein the first page and the second page are separated by a plurality of pages having images thereon;
- receiving a first cropping rectangle on the first page for the first reference image;
- receiving a second cropping rectangle on the second page for the second reference image;
- generating cropping rectangles for the images of on the plurality of pages separating the first page and the second page, wherein the cropping rectangles comprise a linear interpolation of the size and shape of the first cropping rectangle and the second cropping rectangle;
- displaying each of the images with the associated cropping rectangles superimposed thereon; and
- providing an interface adapted to allow a user to adjust the size or position of one or more of the cropping rectangles;
- receiving from the user, an adjustment of at least one of the cropping rectangles; and
- regenerating the cropping rectangle according to the adjustment; and
- cropping the images according to the cropping rectangles.

* * * * *